(12) United States Patent
Gasnier et al.

(10) Patent No.: US 10,491,272 B2
(45) Date of Patent: Nov. 26, 2019

(54) DRONE WITH DYNAMIC ANTENNA DIVERSITY

(71) Applicant: PARROT DRONES, Paris (FR)

(72) Inventors: Eric Gasnier, Saint Prix (FR); Raphaël Prod'Homme, Antony (FR)

(73) Assignee: PARROT DRONES, Paris (FR)

( * ) Notice: Subject to any disclaimer, the term of this patent is extended or adjusted under 35 U.S.C. 154(b) by 0 days.

(21) Appl. No.: 15/856,014

(22) Filed: Dec. 27, 2017

(65) Prior Publication Data

US 2018/0183496 A1    Jun. 28, 2018

(30) Foreign Application Priority Data

Dec. 27, 2016  (FR) .................................. 16 70789

(51) Int. Cl.
*H04B 7/0404* (2017.01)
*H04B 7/06* (2006.01)
*H04L 5/14* (2006.01)
*B64C 39/02* (2006.01)
*G05D 1/00* (2006.01)
*B64D 47/08* (2006.01)
*H04B 7/0426* (2017.01)

(52) U.S. Cl.
CPC ......... *H04B 7/0404* (2013.01); *B64C 39/024* (2013.01); *B64D 47/08* (2013.01); *G05D 1/0038* (2013.01); *H04B 7/0602* (2013.01); *H04L 5/1423* (2013.01); *B64C 2201/027* (2013.01); *B64C 2201/108* (2013.01); *B64C 2201/146* (2013.01); *H04B 7/0426* (2013.01)

(58) Field of Classification Search
CPC .... H04B 7/0404; H04B 7/0602; A63H 27/00; B29C 49/04; B29C 49/4817; B64C 39/024; B64D 47/08; G04D 1/0038; G08C 17/02; H04L 5/1423
USPC .......................................... 370/281
See application file for complete search history.

(56) References Cited

U.S. PATENT DOCUMENTS

| | | | | |
|---|---|---|---|---|
| 2007/0002009 | A1* | 1/2007 | Pasch ................ | G02B 26/0841 345/108 |
| 2007/0071119 | A1* | 3/2007 | Davydov ............. | H04L 1/0041 375/260 |
| 2012/0155562 | A1* | 6/2012 | Lucidarme .......... | H04B 7/0689 375/267 |
| 2015/0123873 | A1* | 5/2015 | Perumana ............ | H01Q 21/30 343/876 |
| 2015/0298807 | A1* | 10/2015 | Chun ....................... | B64C 7/00 244/137.4 |

(Continued)

*Primary Examiner* — Chi Tang P Cheng
(74) *Attorney, Agent, or Firm* — Steven M. Greenberg, Esq.; Shutts & Bowen LLP (57) ABSTRACT

The drone comprises M antennas, with in particular two offset antennas located symmetrically at the ends of two arms for the connection to the propulsion units (24), and a ventral antenna under the drone body. The radio transmission is operated simultaneously on N similar RF channels, with 2≤N<M. An antenna switching circuit couples selectively each of the N RF channels to N antennas out of the M antennas according to a plurality of different coupling schemes, dynamically through a piloting logic selecting one of the coupling schemes. The selection is operated as a function of a signal delivered by the drone-borne microprocessor, as a function of the flight and signal transmission conditions, determined at a given instant.

8 Claims, 4 Drawing Sheets

(56) References Cited

U.S. PATENT DOCUMENTS

2015/0340759 A1* 11/2015 Bridgelall ............. H01Q 1/286
370/329

* cited by examiner

Fig.3a Right antenna @ 2.44 GHz

Fig.3b Central antenna @ 2.44 GHz

Fig.3c Left antenna @ 2.44 GHz

DRONE WITH DYNAMIC ANTENNA DIVERSITY

CROSS-REFERENCE TO RELATED APPLICATIONS

This application claims priority under 35 U.S.C. § 119(a) to French Patent Application Serial Number 1670789, filed Dec. 27, 2016, the entire teachings of which are incorporated herein by reference.

BACKGROUND OF THE INVENTION

Field of the Invention

The invention relates to the remote piloting of motorized devices, hereinafter generally referred to as "drones", and more precisely, the radio-communication antennas used by drones for the remote piloting thereof.

Description of the Related Art

A typical example of consumer flying drone is the BEBOP™ drone manufactured by Parrot, S.A. of Paris, France, which is a rotary-wing drone of the quadricopter type. Another example of a consumer flying drone is the DISCO™ drone also manufactured by Parrot, S.A. of Paris, France, which a fixed-wing drone of the sail-wing type. Yet another type of drone is the JUMPING SUMO™ also manufactured by Parrot, S.A. of Paris, France. However, unlike the BEBOP™ and DISCO™, the JUMPING SUMO™ is a remote-controlled rolling and jumping toy.

Of note, Patent Cooperation Treaty published patent application WO 2010/061099 A2, and European published patent applications EP 2 364 757 A1 and EP 2 613 213 A1 each describe the principle of piloting a drone by means of a touch-screen multimedia telephone or tablet having integrated accelerometers, executing a specific remote-control applicative software program such as the FREEFLIGHT™ brand mobile application published by Parrot, S.A. of Paris, France. The telephone or the tablet may possibly be relayed by a specific remote-control device such as the SKYCON-TROLLER™ brand remote-control device manufactured by Parrot, S.A. which is a console interfaced with the telephone or the tablet, in the form of a box provided with two handles having joysticks and various buttons for an ergonomic piloting by the user in the same way as a dedicated console.

The user may also use immersion-piloting glasses, called "FPV glasses" in respect to a "first person view". The remote control is provided with means for radio link with the drone, for instance a Wi-Fi connection, for the bidirectional exchange of data: i) from the drone to the remote control for transmitting the video image captured by the camera and flight parameters of drone, and ii) from the remote control to the drone for sending piloting instructions to the latter. Various aspects of the radio-communication between the remote control and the drone are described in particular in European patent application publications EP 2 450 862 A1 and EP 3 020 460 A1. It will be understood that the quality of the radio link between the remote control and the drone is an essential parameter, in particular to ensure a satisfying range. Moreover, the transmitted data volumes are significant, in particular due to the very high video rate need of the downlink. De facto, any degradation of quality of the radio link will have an impact on the transmission quality and on the radio range, with a risk of sporadic loss affecting the exchanged data and commands.

At the drone, the radio link uses one or several antennas incorporated in the drone that, in reception, pick up the uplink signals transmitted by the remote-control device, and, in transmission, radiate the power of the HF transmitter circuit supporting the downlink, in particular for the transmission of the video flow and the flight data to the remote control. A significant limitation lies in the regulation constraints applicable to the RF communication systems such as the Wi-Fi communication systems used by the drones (or any other RF power transmitter system). For example, the regulation in force in the United-States in the ISM band 2.4 GHz provides: 1°) a limit of 30 dBm (1 mW) for the total power at the exit of the transmitter, and 2°) a limit of 36 dBm (4 mW) EIRP (Equivalent Isotropically Radiated Power) for the power radiated by the antenna, this second limit corresponding to the own power of the transmitter increased by the gain of the antenna in the direction of its main transmission lobe.

The Wi-Fi specifications advantageously provide the possibility to use simultaneously—in different bands or in the same band—several transmitters and several antennas in accordance to the so-called MIMO (Multiple Input Multiple Output) technique, a multiplexing technique allowing data transfers over a longer range and with a higher rate than a technique of the SISO (Single Input Single Output) type.

French published patent application FR 2 947 401 A1 hence describes a drone provided with a plurality of antennas selectively configurable to ensure data transmissions in multi-antenna MIMO mode. The difficulty comes from the fact that, in the case where several transmitters deliver simultaneously an RF signal, respecting the regulatory radiated power threshold imposes to reduce the own RF power of each active transmitter so that the total RF power wholly radiated remains lower than the imposed threshold (36 dBm in the hereinabove example). Hence, for two antennas radiating simultaneously, it will be necessary to reduce by half (−3 dB) the own power of each transmitter, which will have to output no more than 27 dBm (0.5 mW).

Likewise, for three antennas radiating simultaneously, it will be necessary to divide by three (−4.7 dB) the own power of each transmitter, which will have to output no more than 25.3 dBm (0.35 mW). And likewise, for four antennas radiating simultaneously, it will be necessary to divide by four (−6 dB) the own power of each transmitter, which will have to output no more than 24 dBm (0.25 mW).

BRIEF SUMMARY OF THE INVENTION

Embodiments of the present invention address the deficiencies of the known art described herein and provide an improvement to the radio transmission quality between the drone and the remote control, and hence the user, in taking on board a number of antennas (M antennas) higher than the number of transmitters simultaneously active (N transmitters, at least two in number), and in selecting by suitable switching of only N antennas out of the M antennas equipping the drone. In accordance with the invention presented herein, t is for example possible to provide M≥3 antennas, typically M=3 or 4 antennas, for N=2 transmitters, and hence to select only two antennas out of three, or two antennas out of four.

This switching is operated dynamically, for example at regular time intervals, so as to modify if necessary the specific switching scheme of the N transmitters to the M antennas so that the configuration of effectively switched antennas remains optimum. In the above example, by selecting only two antennas out of three (or four), it is possible to obtain, per antenna, a radiated power higher than that of a conventional system with three (or four) antennas operating simultaneously in MIMO. Still in this example, in a conventional four-antenna MIMO system, it would be necessary to reduce the own power of each transmitter by 6 dB to respect the regulation, whereas, with the solution of the invention, still with four antennas, the required reduction will be of only 3 dB because only two antennas out of the four will be active.

This dynamic reconfiguration of the configuration channel hence allows creating a "dynamic diversity" of the antenna network, taking into account the displacements of the drone with respect to the remote control, even if these displacements produce permanent modifications of the orientation of the drone (and hence of the antennas thereof), of the environmental conditions, of the distance, etc., that permanently disturb the radio link. The dynamic reconfiguration of the antenna network hence allows always keeping the better condition of RF transmission that maximizes the data rate and minimizes the signal/noise ratio, especially when the antennas of the drone do not have an isotropic radiation. More precisely, the invention proposes for that purpose a drone comprising, in manner known per se for example from above-mentioned FR 2 947 401 A1, a drone body, a digital controller circuit, an RF transmitter stage comprising a baseband processor circuit adapted to deliver an RF signal to be transmitted, and M fixed antennas integral with the drone body.

Characteristically of the invention, the RF transmitter stage further comprises: an RF dispatcher stage receiving as an input the RF signal to be transmitted and delivering as an output N similar RF supply signals, with $2 \leq N < M$; an antenna switching circuit, adapted to selectively couple each of the N RF supply signals to N antennas out of the M antennas according to a plurality of different coupling schemes; and a logic for piloting the antenna switching circuit, adapted to dynamically determine one of said coupling schemes as a function of a selection signal delivered by the control circuit.

According to various advantageous subsidiary characteristics:

The logic for piloting the antenna switching circuit is adapted to dynamically determine one of said coupling schemes also as a function of a synchronization signal delivered by the baseband processor circuit, so as to inhibit the application of the selection signal to the antenna switching circuit at least for the duration of transmission of a frame of RF signal to be transmitted;

when N=2 and M=3, the antenna switching circuit is adapted to selectively couple: a first RF supply signal to either one of a first antenna and a third antenna, and a second RF supply signal to either one of a second antenna and the third antenna;

in this same case, the first antenna and the second antenna are advantageously lateral antennas positioned symmetrically on either side of the drone body, and the third antenna is a ventral antenna positioned under the drone body;

when N=2 and M=4, the antenna switching circuit is adapted to selectively couple: a first RF supply signal to either one of a first antenna and a third antenna, and a second RF supply signal to either one of a second antenna, the third antenna and a fourth antenna;

the RF dispatcher stage comprises N similar front-end RF modules, each receiving as an input the RF signal to be transmitted and delivering as an output one of the N similar RF supply signals;

one at least of the N RF supply signals comprises a first signal component in the band 2.4 GHz duplexed with a second signal component in the band 5 GHz.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

An exemplary embodiment of the device of the invention will now be described.

Figure 1:
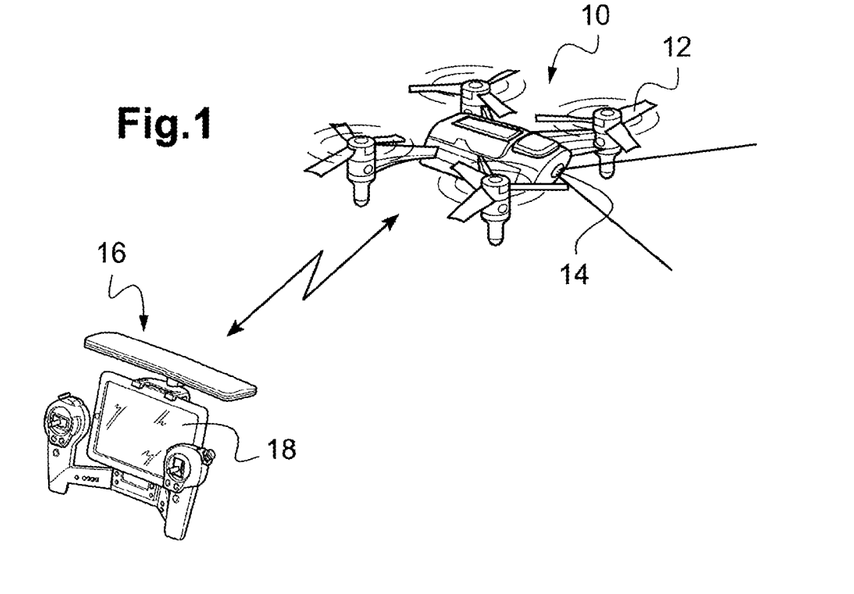
FIG. 1 is a general view showing a drone piloted by a remote-control device.

In FIG. 1, the reference 10 generally denotes a drone that has four coplanar rotors 12, whose motors are piloted independently from each other by an integrated navigation and attitude control system. A front-view camera 14 is provided, allowing obtaining an image of the scene towards which the drone is directed. The drone 10 is piloted by a user by means of a distant remote-control device 16, hereinafter called "remote control", provided with a screen 18 configured to display the image captured by the camera 14 of the drone. The remote control 16 is for example the Skycontroller model from Parrot, on which has been mounted a smartphone (pocket mobile terminal) or a touch-screen multimedia digital tablet of the standard type, not modified except the loading of a specific applicative software (such as the mobile application AR Free Flight from Parrot) to control the piloting of the drone 10 and the visualization of the images taken by the camera 14. The screen 18 displays, in superimposition with the image captured by the camera 14, a certain number of flight parameters as well as symbols allowing the activation of piloting commands (move up/move down, etc.) by simple contact of a finger of the user on these symbols, and/or by imparting to the remote control inclinations according to roll and pitch axes to make the drone move forward or rearward. The actions of the user are interpreted by the specific applicative software, which transforms them into command signals for the drone.

The remote control 16 is also provided with means for radio link with the drone, for example of the WiFi local network type, very advantageously a link of the standard WiFi type (IEEE 802.11n) of the dual-band type 2.4 GHz and 5 GHz (more precisely 2.40 GHz-2.4835 GHz and 5.15 GHz-5.85 GHz) and MIMO, established directly with the drone. More precisely, this wireless radio link is bidirectional and comprises an uplink (from the remote control to the drone) and a downlink (from the drone to the remote control) to transmit data frames containing:

(from the remote control to the drone) the piloting and control instructions, sent at regular intervals and on a systematic basis, as well as various elements of information and parameters for the drone;

(from the drone to the remote control) the video flow coming from the camera; and (from the drone to the remote control) when necessary, flight data established by the drone or state indicators such as: battery level, flight phase (takeoff, self-stabilisation, landed on the ground, etc.), altitude, detected defect, etc.

The WiFi network implemented is advantageously a non-modified standard network, which allows benefiting from the multiple functionalities of the WiFi specification: protection against collisions, data encapsulation, network access management, encryption and authentication, management of the frequency plane, etc. It will be however noted that the use of a standard WiFi is not in any way limitative of the invention, and that it applies as well to any "proprietary" RF transmission system made according to non-standard specifications, specific the manufacturer.

Figure 2:
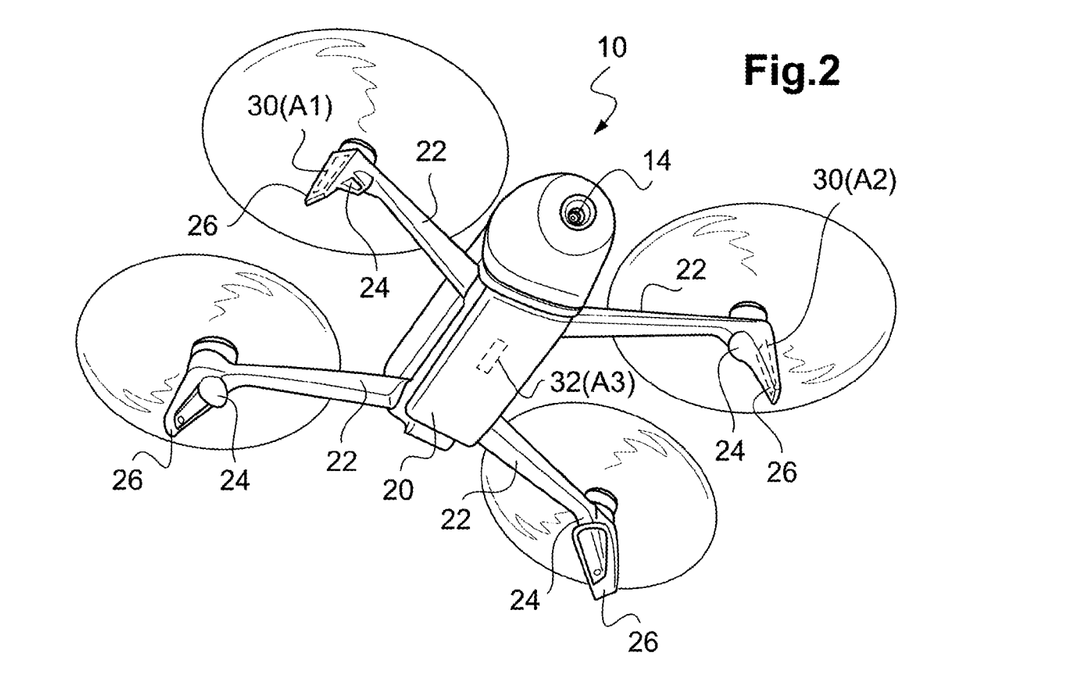
FIG. 2 is a perspective view from bellow of the drone in flight, showing in particular the geometry of the antenna network used for the implementation of the invention, in this example a three-antenna network.

FIG. 2 illustrates the drone 10 in flight. This drone comprises, in the illustrated example of a quadricopter, a drone body 20 from which extend four arms 22, with two front arms and two rear arms. Each arm 22 carries at its distal end a motor unit 24 driving a respective propeller into rotation. The motor unit 24 is extended downward by an extension forming a foot 26 that supports the drone when the latter is landed on the ground. The drone includes two offset antennas 30 arranged in the front feet. Each of these antennas is for example made in a printed form on a circuit board inserted in a counterpart accommodation arranged in the foot 26, with suitable connection means allowing connecting the antenna to the RF circuits located in the drone body 20. This configuration of offset antennas allows in particular moving the antennas away from the metal masses contained in the drone body 20. The antennas 30 each have a wide-aperture, substantially homogeneous, sectorized radiation diagram, included in a hemispherical half-space, ensuring a good lateral covering on either side of the drone, taking into account the symmetrical arrangement of the two antennas 30.

In other configurations, in particular better adapted to the drones of the sailwing type, where there is no arm extending from a drone body, the two antennas may be arranged symmetrically in the fuselage of the drone, with however the drawback that these antennas are more sensitive to the nearby metal elements located in the fuselage, which may cause a less homogeneous radiation diagram due to these disturbing elements.

In any case, the two antennas of the drone are coupled to respective RF inputs/outputs of the WiFi RF chip, the chips generally used being provided with two identical RF inputs/outputs. Conventionally, the WiFi antennas used are dual-band antennas, liable to radiate in two different bands such as the two WiFi bands 2.4 GHz and 5 GHz, in particular to allow an MIMO operation in which these two bands are used concurrently.

To allow such simultaneous spatial transmissions (and likewise simultaneous receptions), each input/output of the RF chip then includes four terminals, i.e. two transmission terminals (TX 2.4 and TX 5) and two reception terminals (RX 2.4 and RX 5). However, the known two-transmitter and two-antenna configuration described hereinabove is not always optimum. Indeed, when the drone is vertically above the user or near this vertical (hence approximately in a cone whose apex would be located where the user is), the combined radiation diagram of the two antennas has high gain irregularities, because the direction corresponds to both edge regions of the diagrams of each of the antennas. This results in erratic losses in the radiated power (or in the received signal), which may occasionally lead to very noisy communications and to a loss of information transmission rate between the drone and the remote control.

With a rotary-wing drone, this drawback may occur even when the drone is rather far from the user: indeed, this rapid changes of horizontal speed of the drone are obtained by nose-up, turn-over movements, etc., of the drone with respect to the vertical, which modify abruptly the orientation of the antenna network, and hence of the radiation diagram, with respect to the direction of the user. That way, in certain flight configurations, the user may be in a particular direction of the radiation diagram showing a trough or strong irregularities.

To compensate for these drawbacks, the starting point of the invention lies in the addition of one (or several) additional antenna(s), having in particular a radiation diagram with a main lobe oriented in the direction of the gain trough or of the gain irregularities of the two first antennas. That way, it is possible to compensate for these troughs or irregularities and, overall, to establish a substantially isotropic radiation diagram.

In the example illustrated in FIG. 2, the drone has been provided with a third antenna 32 arranged in the ventral region in the centre of the drone body 20. The main axis of radiation of this ventral antenna 32 is oriented vertically and turned downward. This three-antenna (or more) configuration allows ensuring in all the configurations of the drone a satisfying communication between the drone and the distant remote control, with homogeneous radio performances in any circumstances.

Figure 3A:
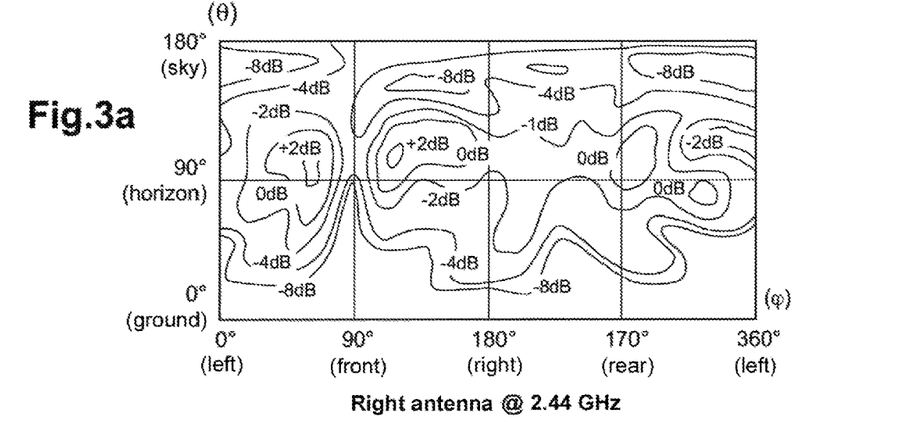
FIGS. 3*a*, 3*b* and 3*c* are radiation diagrams of the antennas of the drone illustrated in FIG. 2, for the right antenna, the ventral antenna and the left antenna, respectively.
Figure 3B:
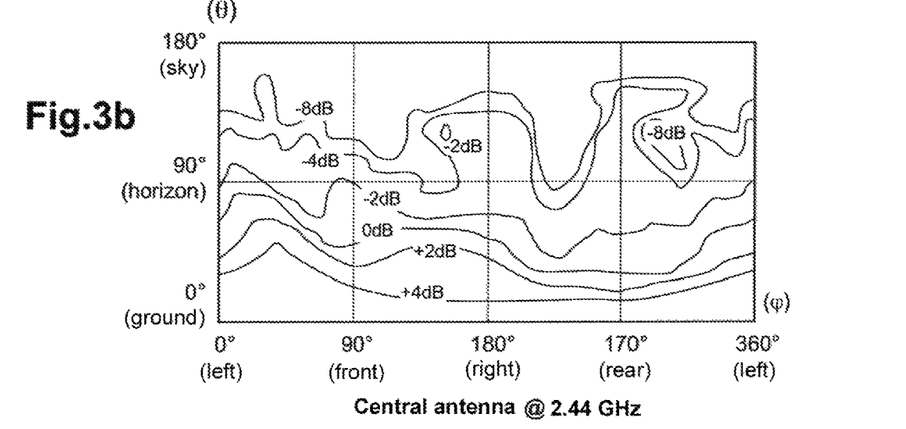
Figure 3C:
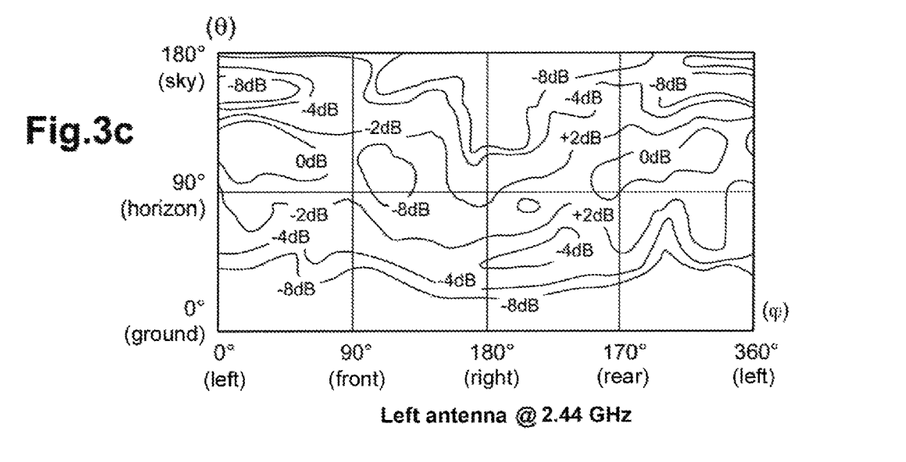

In this respect, it will be referred to FIGS. 3a, 3b and 3c, which are radiation diagrams of the antennas of the drone illustrated in FIG. 2, for the right antenna 30, the ventral antenna 32 and the left antenna 30, respectively. These diagrams give for each antenna, in level curves, the gain in the different directions of the space defined by the elevation angle θ and the azimuth angle φ. As can be observed, the ventral antenna 32 provides a high gain towards the ground (FIG. 3b, towards the direction θ=0), whereas the lateral antennas (FIGS. 3a and 3c) have on the other hand a low gain in this direction. Conversely, for directions closed to the horizon (θ=90°), the lateral antennas 30 provide best performances than the ventral antenna 32 in terms of gain.

However, if the number of antennas is increased and each antenna is coupled to a respective transmitter/receiver, to respect the regulation constraints of maximum total radiated power, it is necessary to reduce proportionally the own power of each transmitter. Hence, for example, with a typical antenna gain of 6 dBi, if two transmitters are used, the unitary power must be reduced by −3 dB, with three transmitters, by −4.7 dB and with four transmitters, by −6 dB. Accordingly, instead of using simultaneously as much transmitters as antennas, in selecting only a reduced number of antennas, for example two antennas out of three, or two antennas out of four, and to supply only the selected antennas (hence using only two transmitters simultaneously active in this example).

Hence, in the above-mentioned example, by using only two simultaneously active transmitters, it will be necessary to reduce the unitary power by only −3 dB, in any circumstances, because only two antennas out of three or four will be active at any given instant, with hence a unitary radiated power per antenna higher than that of a system using three or four antennas operating simultaneously, in MIMO. The switching of the antennas is operated dynamically, in real time, as a function of a selecting signal delivered by the microprocessor of the drone that executes a suitable algorithm determining which antennas must be selected at a given instant.

Figure 4:
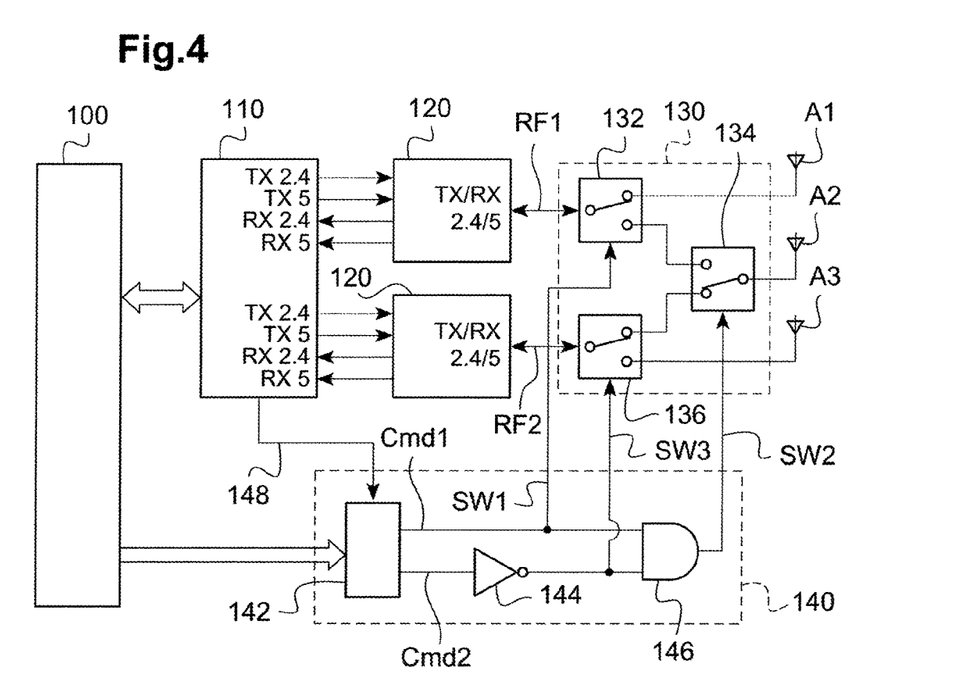
FIG. 4 is a block diagram of the RF chain of the drone implementing the teachings of the invention, in a two-channel and three-antenna configuration.

FIG. 4 is a block diagram of the RF chain of the drone implementing the teachings of the invention, in a two-radio channel and three-antenna configuration. All the circuits are controlled by a digital controller circuit 100, consisted by the drone-borne microcontroller piloting in particular the various flight control and remote-control communication functions. The digital controller circuit 100 exchanges information with a baseband processor circuit 110, which is a circuit known per se (for example, a Qualcomm chipset QCA6174) and that won't be described in detail.

The baseband processor manages all the radio control functions such as signal modulation, coding/decoding, frequency transposition, etc. It is on the one hand interfaced with the digital controller circuit 100 that pilots it, and it is on the other hand provided with a certain number of terminals for its interfacing with the transmission/reception RF circuit itself. In the particular case of a dual-band WiFi transmission, the baseband processor circuit includes output (transmission) terminals TX 2.4 and TX5 corresponding to each of the two respective WiFi bands 2.4 and 5 GHz, and input (reception) terminals RX 2.4 and RX 5 corresponding to these two same bands. Moreover, these fours input/output terminals are split, so as to be able to be coupled to two identical RF circuits, in particular to be able to ensure a simultaneous transmission on two RF channels coupled to two respective antennas.

The baseband processor circuit 110 is coupled to an RF dispatcher stage consisted of two identical front-end modules 120 through the just described input/output terminals TX/RX. The front-end modules 120 comprise chips of the front-end type, allowing processing high RF frequency analog signals, from baseband signals delivered or received by the baseband processor circuit 110. They essentially comprise, in transmission, a power amplifier (PA), and in reception, a flow noise amplifier (LNA). Each of the front-end modules 120 transmits (or receives) a respective radiofrequency signal RF1, RF2. Each of the signals RF1 or RF2 transmitted or received by a front-end module 120 comprises a first signal component in the baseband 2.4 GHz, duplexed with a second signal component in the band 5 GHz.

In a conventional configuration, each of the front-end modules would be directly coupled to a respective transmission/reception antenna for the Wi-Fi transmission, according to an invariable, static configuration. But, in the present invention, the coupling between the front-end modules 120 and the antennas is operated through a specific antenna-switching circuit 130 ensuring the interfacing between, on the one hand, the two radiofrequency signals RF1, RF2, and one the other hand, three antennas A1, A2, A2 (in the embodiment illustrated in FIG. 4). The antennas A1 and A2 may in particular be offset antennas 30 located at the end of the arms for the connection to the propulsion unit of the drone, the antenna A3 being the ventral antenna 32 located under the drone body, in central position.

In the illustrated embodiment, the antenna switching circuit 130 comprises a first switching 132 receiving as an input the signal RF1 and directing the latter either towards the antenna A1, or towards a first pole of a second switch 134. A third switch 136 receives as an input the signal RF2 and directs the latter either towards the antenna A3, or towards a second pole of the second switch 134. The second switch 134 selects either one of its poles to couple the latter to the antenna A2. The RF switches used by the circuit 130 are switches of a type known per se (for example, chips of the Skyworks 13350/13320 family) and won't be described in more detail.

The states of the three switches 132, 134 and 136 are controllable by respective switching signals SW1, SW2, SW3 delivered by a piloting logic 140 controlled by the digital controller circuit 100. The piloting logic 140 comprises a circuit 142 receiving as an input switching signals Cmd1 and Cmd2 delivered by the digital controller circuit 100 as a function of a certain number of parameters produced by an algorithm that determines which antennas must be selected. For this selection, the algorithm may in particular take into consideration:

the position of the drone and the orientation of the drone (more or less significant inclination, taking into account in particular the changes of horizontal speeds) with respect to the user in an absolute reference system linked to the ground: the algorithm then determines the antennas of the drone, whose radiation diagram has the better orientation with respect to the user;

the measurement of the signal level (RSSI) received by each of the antennas picking up the signals coming from the remote control: the measured RSSI indeed provides information about the quality of the radio link between the drone and the remote control;

an automatic selection of the antennas according to a sequence that may be random and regular, so as to measure the RSSI on each of the antennas (this selection taking into account that, due to the presence of the switching circuit 130, the antennas are never all simultaneously coupled to the receiver stages of the RF chain).

Moreover, the digital controller circuit 100 being not synchronized with the baseband processor circuit 110 and the front-end modules 120, it is advisable to synchronize the switching of the antennas to the transmitted and received frames so as not risking cutting these frames during the transmission. For that purpose, the piloting logic 140 is coupled to the baseband processor circuit 110 by a link 148 ensuring the synchronization between the signals sent by the digital controller circuit 100 and the frames processed in transmission/reception by the baseband processor circuit 110.

In the embodiment illustrated in FIG. 4, the piloting logic 140 includes an inverter 144 receiving as an input the signal Cmd2, and a gate AND 146 receiving on one of its inputs the signal Cmd1 and on the other input the signal Cmd2 after inversion. The selection signal SW1 of the switch 132 corresponds to the signal Cmd1, the switching signal SW3 of the switch 136 corresponds to the signal Cmd2 inverted, and the signal SW2 for controlling the switch 134 corresponds to the output of the gate 146. The corresponding truth table is the following:

Truth Table for 3 Antennas/2 Transmitters

| Cmd1 | Cmd2 | SW1 | SW2 | SW3 | RF1 | RF2 |
|------|------|-----|-----|-----|-------|-------|
| 1 | 1 | 1 | 0 | 0 | ANT 1 | ANT 3 |
| 0 | 1 | 0 | 0 | 0 | ANT 2 | ANT 3 |
| 1 | 0 | 1 | 1 | 1 | ANT 1 | ANT 2 |
| 0 | 0 | 0 | 0 | 1 | ANT 2 | — |

Of course, the different possible coupling schemes between, on the one hand, the two channels RF1 and RF2, and on the other hand, the three antennas A1, A2 and A3 corresponding to this truth table are not limitative; other coupling configurations are also contemplatable, taking into account in particular the particular geometry of the different antennas of the drone, their position on the latter, and their own radiation diagram.

Figure 5:
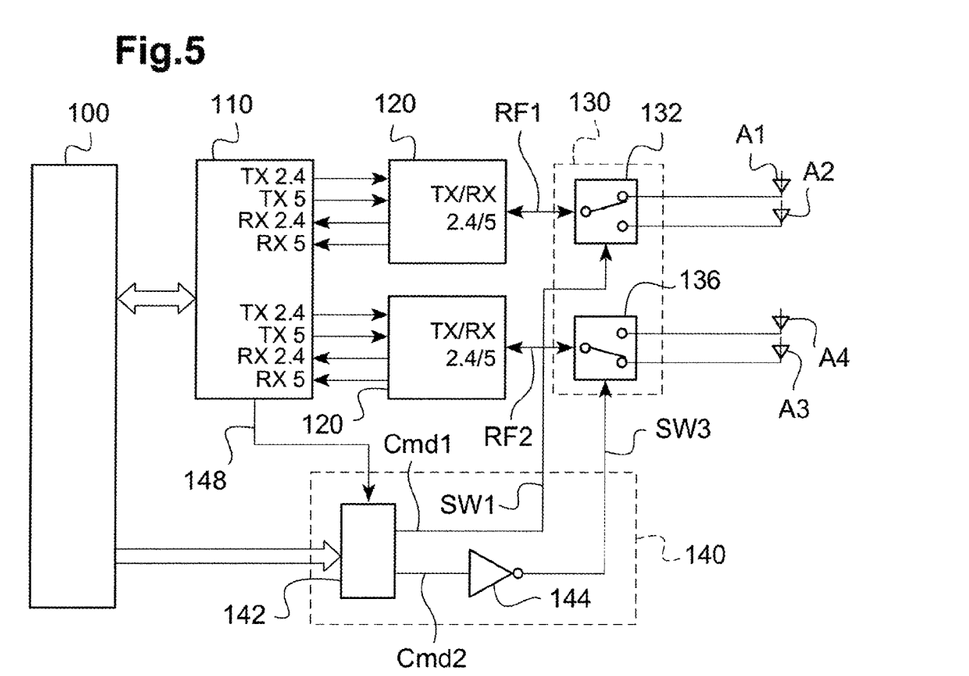
FIG. 5 is a block diagram of the RF chain of the drone implementing the teachings of the invention, in a two-channel and four-antenna configuration.

FIG. 5 is a block diagram illustrating a variant in which the drone no longer includes three, but four different antennas A1, A2, A3, A4 that are selectively switchable to allow the coupling thereof to the two channels for transmission/reception of the signals RF1 and RF2. The elements denoted by the same digital references as in FIG. 4 ensure identical functions, and won't be described in more detail. In the case of FIG. 4, the antenna switching circuit 130 includes only two switches 132 and 136. The switch 132 receives as an input the signal RF1 and couples the latter either to a first antenna A1 or to an second antenna A2, whereas the switch 136 couples the signal RF2 either to a third antenna A3 or to a fourth antenna A4. The switches 132 and 136 are controlled by the selection signals SW1 and SW3 delivered by the piloting logic 144 in the same way as what is described about FIG. 4.

The corresponding truth table is the following:
Truth Table for 4 Antennas/2 Transmitters

| Cmd1 | Cmd2 | SW1 | SW3 | RF1 | RF2 |
|------|------|-----|-----|-------|-------|
| 1 | 1 | 1 | 0 | ANT 1 | ANT 3 |
| 0 | 1 | 0 | 0 | ANT 2 | ANT 3 |
| 1 | 0 | 1 | 1 | ANT 1 | ANT 4 |
| 0 | 0 | 0 | 1 | ANT 2 | ANT 4 |

Of course, the configuration of coupling schemes is not limitative, and other configurations with two RF channels and four antennas may also be contemplated while remaining within the framework of the invention. Likewise, the invention is not limited to the coupling of N=2 RF channels (signals RF1 and RF2 in the examples described) to M=3 or 4 antennas (antennas A1-A3 or A1-A4 in the examples described), but may be generalized to the coupling of N RF channels to M antennas, with 2≤N<M, this coupling being a dynamic coupling modifiable in real time. The coupling is modified as a function of selection signals delivered by a piloting logic controlled by the digital controller circuit of the drone based on an algorithm for searching and selecting the optimum coupling scheme of the RF channels to the antennas.

Figure 6:
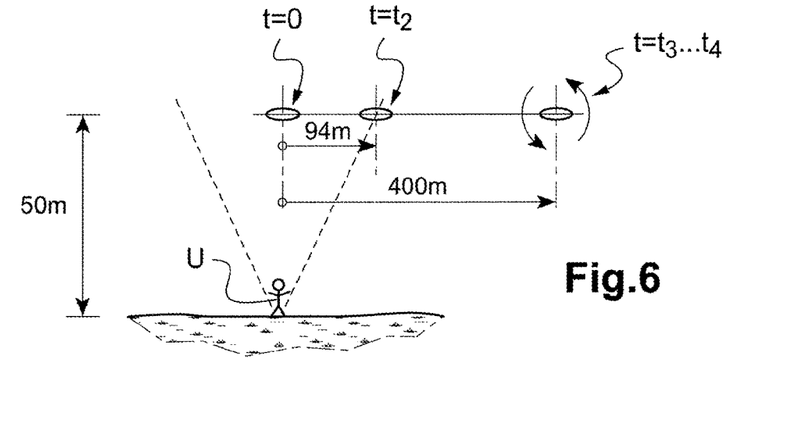
FIG. 6 is a diagram illustrating a drone in flight, with various changes of position corresponding to the trajectory of this drone with respect to a user static on the ground.
Figure 7A:
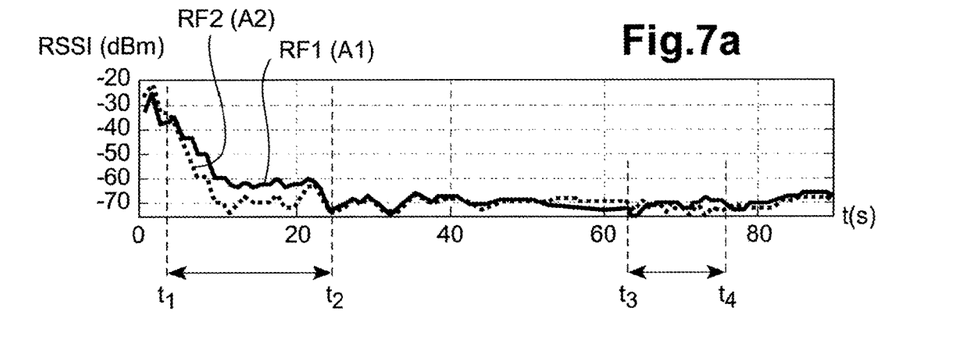
FIGS. 7*a* and 7*b* illustrate the variations of signal level received by the user when the drone moves as illustrated in FIG. 4, with and without implementation of the teachings of the invention, respectively.
Figure 7B:
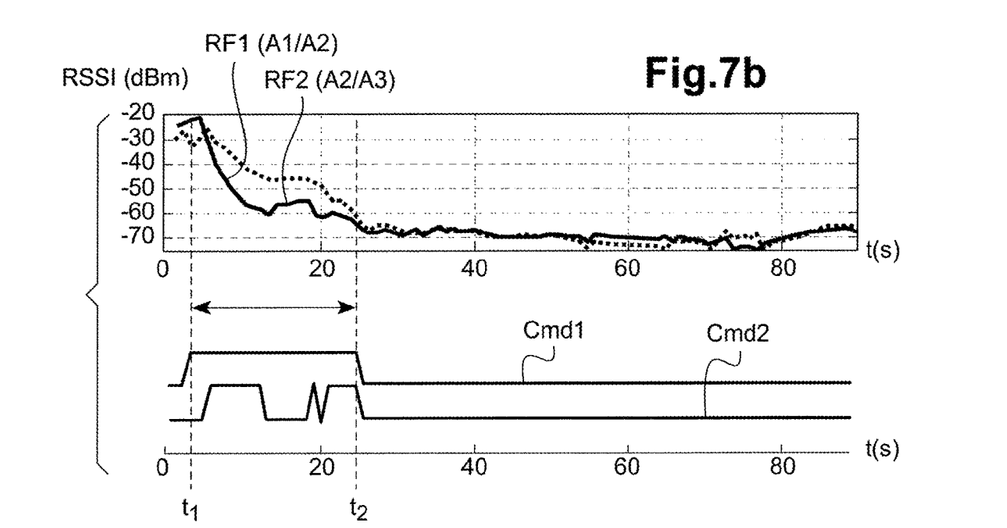

FIGS. 6, 7a and 7b illustrate an example of implementation of the embodiment of the invention shown in FIG. 4 and described hereinabove. FIG. 6 is a scheme illustrating a drone in motion, with various changes of position corresponding to the trajectory of this drone with respect to a user static on the ground. FIGS. 7a and 7b illustrate the variations of the signal level received by the user when the drone moves as illustrated in FIG. 6, with and without implementation of the teachings of the invention, respectively. FIG. 6 illustrates the example of a drone flying at an altitude of about 50 m above a user U equipped with a remote control for piloting the drone. At an instant t=0, the drone is vertically above the user, then it moves in horizontal flight, at constant altitude, to the right, hence going away from the user. This trajectory continues over a distance of about 400 m, until t=t3, where the drone comes to a halt and performs a rotation over itself until a time t=t4.

FIG. 7a illustrates the level of the signal received by the drone (RSSI indicator) from the transmissions produced by the remote control of the user on the two channels RF1 and RF2, in a conventional configuration in which both antennas A1 and A2 (for example the antennas 30 on the representation of FIG. 2) are directly coupled to the respective RF channels RF1 and RF2. In this static configuration of the antennas (the channel RF1 is always coupled to the antenna A1 and the channel RF2 is always coupled to the antenna A2), a fast decrease of the received signal level is observed between the instants t1 and t2 when the drone, although relatively close in distance to the user, moves laterally away from the latter with respect to the vertical.

FIG. 7b illustrates the level (RSSI) of the signal received by the drone in the same phase of flight, but with implementation of the dynamic selection of three antennas, according to the invention. The chronograms added at the bottom of FIG. 7b indicate the values of the command signals Cmd1 and Cmd2 produced by the piloting logic 140 to select dynamically a coupling scheme of the three antennas to the two RF channels, as a function of instructions elaborated by the digital controller circuit 100 and transmitted to the antenna switching circuit 140.

At instant t=0, the drone uses the antenna A1 on the channel RF1 and the antenna A2 on the channel RF2 (default initial configuration). At t=t1, the digital controller circuit decides to use the antenna A3 (corresponding to the ventral antenna 32) for the channel RF2, instead of the antenna A2, because this configuration provides a better transmission. This configuration is kept until instant t=t2. For the channel RF1, between t1 and t2, this channel is coupled either to the antenna A1 or to the antenna A2 (which is no longer used for the RF2 channel), according to the circumstances and the levels of the signals received.

From t=t2, the digital controller circuit decides to use the antenna A1, which is again coupled to the channel RF1, the antenna A2 being then coupled to the channel RF2. In concrete terms, this change of configuration corresponds approximately to a distance of the drone of about 94 m with respect to the vertical above the user.

If the respective signal levels RSSI in FIGS. 7a (state of the art) and 7b (invention) are compared, it is observed that the level of the signal received is significantly increased during the period comprised between t1 and t2, which generally corresponds to a phase of flight in which the drone is located with respect to the user in a cone of about 94/50 of half apex angle.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A drone comprising:
a drone body;
a digital controller circuit;
a radio-frequency (RF) transmitter stage comprising a baseband processor circuit adapted to deliver an RF signal to be transmitted; and
M fixed antennas integral with the drone body, wherein the RF transmitter stage further comprises:
an RF dispatcher stage, receiving as an input the RF signal to be transmitted and delivering as an output N RF supply signals, with $2 \leq N < M$;
an antenna switching circuit, adapted to selectively couple each of the N RF supply signals to each of the N antennas out of the M antennas according to a plurality of different coupling schemes; and
logic piloting the antenna switching circuit and adapted to both dynamically determine one of said coupling schemes as a function of a selection signal delivered by a control circuit, and also dynamically determine one of said coupling schemes also as a function of a synchronization signal delivered by the baseband processor circuit, the logic inhibiting the application of the selection signal to the antenna switching circuit at least for the duration of transmission of a frame of RF signal to be transmitted.

2. The drone of claim 1, wherein the supply signals comprises two RF supply signals and the M fixed antennas comprise three antennas.

3. The drone of claim 2, wherein the antenna switching circuit is adapted to selectively couple:
   a first RF supply signal to either one of a first antenna and a third antenna, and
   a second RF supply signal to either one of a second antenna and the third antenna.

4. The drone of claim 2, wherein the first antenna and the second antenna are lateral antennas positioned symmetrically on either side of the drone body, and the third antenna is a ventral antenna positioned under the drone body.

5. The drone of claim 1, wherein the supply signals comprise two RF supply signals and the antennas comprise four antennas.

6. The drone of claim 5, wherein the antenna switching circuit is adapted to selectively couple:
   a first RF supply signal to either one of a first antenna and a third antenna, and
   a second RF supply signal to either one of a second antenna, the third antenna and a fourth antenna.

7. The drone of claim 1, wherein the RF dispatcher stage comprises N similar front-end RF modules, each receiving as an input the RF signal to be transmitted and delivering as an output one of the N RF supply signals.

8. The drone of claim 1, wherein one at least of the N RF supply signals comprises a first signal component in the band 2.4 GHz duplexed with a second signal component in the band 5 GHz.

* * * * *